UNITED STATES PATENT OFFICE 2,483,284

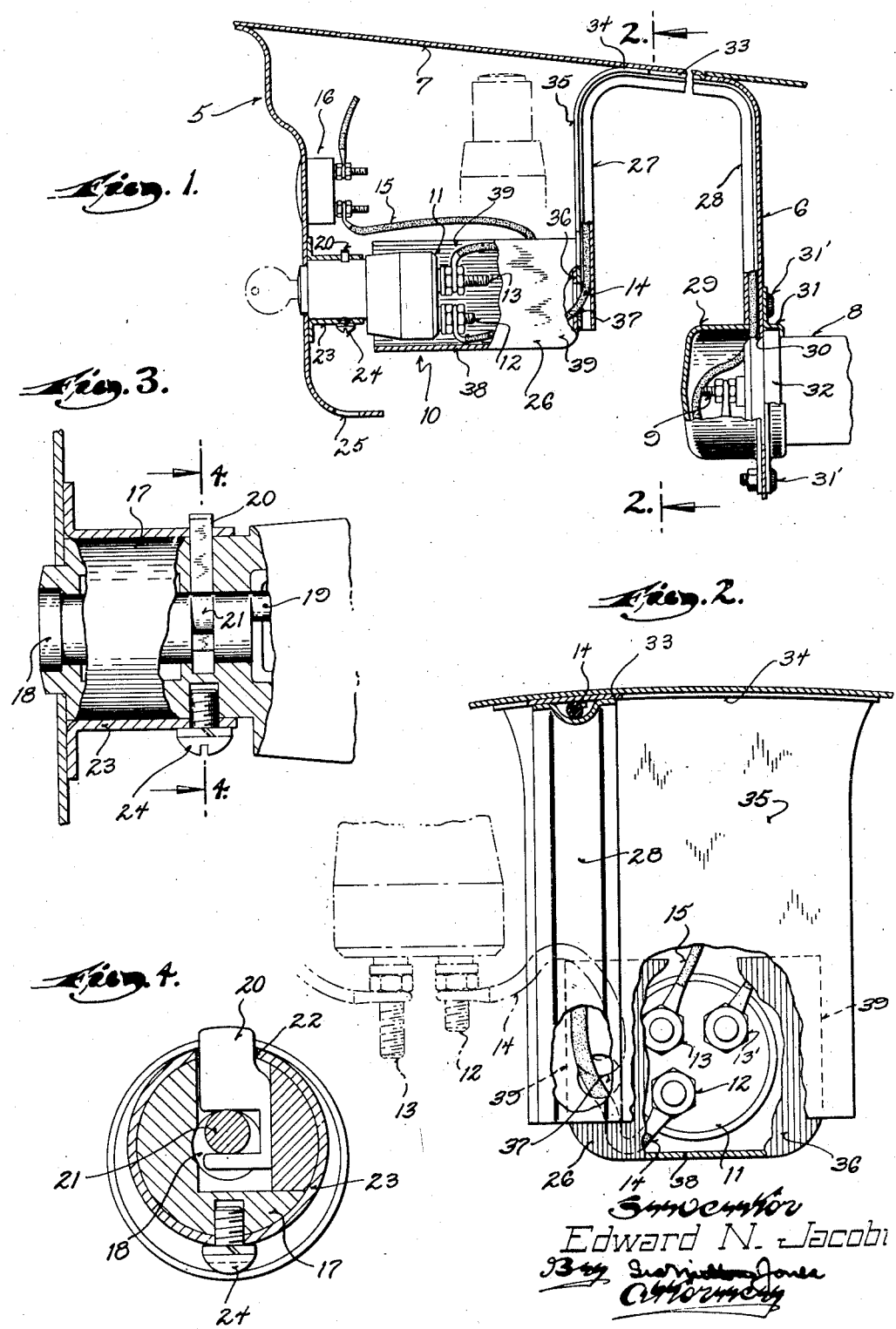

PROTECTOR FOR AUTOMOBILE IGNITION SWITCH COIL LEADS

Edward N. Jacobi, Milwaukee, Wis., assignor to Briggs & Stratton Corporation, Milwaukee, Wis., a corporation of Delaware Application December 15, 1947, Serial No. 791,735

12 Claims. (Cl. 180—82)

This invention relates to the protection of automobiles against theft, and more specifically has as its purpose to make it practically impossible to reach the lead connecting the ignition coil with the ignition switch. By so protecting this lead, and especially its connection to the coil terminal of the switch, fairly good protection is had against having a locked ignition switch circumvented or "jumpered."

In general this invention achieves the desired protection of the coil terminal of the ignition switch and the conductor leading therefrom by placing the conductor in a protecting sheath and by locking the switch to the instrument panel of the automobile and so positioning a guard with respect to the ignition switch, and especially its coil terminal, as to effectually obstruct access thereto as long as the switch remains locked to the instrument panel.

It is an object of this invention to provide guard means so constructed and disposed with respect to the ignition switch and the terminals thereof that the terminals of the switch other than the coil terminal thereof cooperate with the guard to obstruct access to the coil terminal as long as the switch is in position on the instrument panel.

Another object of this invention is to provide an inexpensive expedient for protecting the coil terminal of the ignition switch and the conductor leading therefrom which incorporates a protective covering for the terminal of the ignition coil.

Still another object of this invention is to provide protection for the ignition switch coil terminal and the conductor leading from it to the ignition coil, which may be incorporated in the body construction of the automobile with a minimum of expense at the time of its manufacture.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a longitudinal sectional view through the instrument panel, cowl, and part of the bulkhead of an automobile illustrating how this invention is applied thereto;

Figure 2 is a cross sectional view through Figure 1 on the plane of the line 2—2;

Figure 3 is an enlarged view partly in section and partly in elevation illustrating the manner in which the ignition switch is locked to the instrument panel; and Figure 4 is a detail cross sectional view taken through Figure 3 on the plane of the line 4—4.

Referring now particularly to the accompanying drawing the numeral 5 designates the instrument panel of an automobile or other internal combustion engine driven vehicle, which also includes a bulkhead 6 and a cowl portion 7. As is customary the bulkhead 6 divides the vehicle into a passenger compartment and an engine compartment.

The ignition system of the engine (not shown) includes the customary ignition coil 8 having a terminal 9 adapted to be connected to the battery (not shown) upon closure of an ignition switch indicated generally by the numeral 10. The ignition switch is mounted on the instrument panel 5 with its terminal head 11 and the terminals 12, 13 and 13' thereon behind the instrument panel. A conductor 14 electrically connects the terminal 9 of the coil 8 with the coil terminal 12 of the ignition switch. Another conductor 15 connects the battery terminal 13 of the switch with the battery (not shown). Preferably the conductor 15 has an ammeter 16 connected in series therein, the meter being mounted on the instrument panel as is customary. The other terminal 13' of the switch may be connected to the heater, radio or other appliance with which the automobile may be equipped.

The ignition switch 10, in addition to the terminal head 11, comprises a casing 17 in which the switch mechanism (not shown) is housed and in which a key controlled cylinder 18 is rotatably mounted. The cylinder 18 has the usual key operated tumblers (not shown) by which the cylinder may be locked against rotation with the switch in its open or "off" position. Insertion of the proper key and rotation of the cylinder actuates the switch mechanism in the customary manner through a driver 19 projecting from the cylinder.

Obviously, unless some means is provided to protect the coil terminal of the switch and the conductor leading from it to the ignition coil, locking the switch closed affords small assurance against theft; and while many schemes have been employed in the past to provide protection against circumventing or "jumpering" the locked ignition switch, most of the expedients heretofore available for this purpose have been quite costly. The present invention achieves a substantial degree of protection at a minimum cost. To this end the ignition switch is locked to the instrument panel and means are provided to obstruct access to the terminals of the switch and the coil conductor 14 leading from it, as long as the switch remains locked to the instrument panel.

Any suitable way of locking the switch in place may be employed. In the present case, when the lock cylinder is in its locked position of rotation, a tumbler 20 slidably mounted in the casing 17 and driven by an eccentric 21 on the lock cylinder projects into a keeper recess 22 in a mounting bushing 23. This bushing is fixed to the back of the instrument panel and receives the casing 17. A screw 24 passing through the bottom of the bushing and threaded into the casing cooperates with the tumbler 20 to hold the switch in place.

Rotation of the cylinder 18 to an unlocked position retracts the tumbler 20 and frees the switch casing for bodily rearward withdrawal from the bushing 23, except for the removal of the locking screw 24, to which access may be had for its removal through a hole 25 in the bottom of the instrument panel.

As long as the ignition switch is locked to the instrument panel access to its coil terminal 12 is effectively precluded by a novel guard 26. The guard 26 is a substantially channel-shaped or trough-like stamping having a bottom wall 38, side walls 39 and an end wall 36. Its width is slightly greater than the diameter of the terminal head of the switch and its side walls 39 are sufficiently high to extend above the top of the switch when the bottom wall 38 is in close juxtaposition to the underside of the switch. The guard is held in a position snugly embracing or hugging the bottom and sides of the switch by a supporting bracket 35 joined to the end wall 36 of the guard and fixed to an adjacent wall of the automobile behind the instrument panel.

While the supporting bracket 35 may be fixed to any suitable adjacent wall, it is preferably secured to the cowl 7. For this purpose the bracket has an attaching flange 34 at its top which fits against and is spot welded to the underside of the cowl 7.

In addition to providing a rigid support for the guard 26, the bracket also supplements the guard in its function of obstructing access to the switch terminals. For this reason the bracket is made relatively wide so as to extend a substantial distance to each side of the guard and thus effectively prevent access to the switch terminals from behind the switch. In this sense, therefore, the bracket may be considered part of the guard.

As will be readily seen, the described relationship between the guard and the switch takes advantage of the crowded condition of the limited space behind the instrument panel to achieve effective protection for the switch terminals.

The conductor 14 which connects the terminal 12 of the switch with the ignition coil 8 extends back from the terminal 12 along the bottom of the guard and passes through a port 37 in the back of the guard formed by aligned holes in the walls 35 and 36.

Obviously the portion of the conductor extending between the port 37 and the ignition coil must be protected. While any suitable enclosure for this portion of the conductor would give this protection, an inexpensive and practical method of securing this protection is to employ simple stampings which are formed to cooperate with existing walls to produce a sheath 27 for the conductor.

One of these stampings comprises a relatively narrow strip 28 having a conductor receiving depression extending longitudinally along the central portion of the strip, flanked by attaching flanges lying in a common plane. One end portion of the strip 28 is welded to the back of the bracket 35 with the lower end of the strip covering the port 37 to receive the conductor 14. Preferably the strip 28 and the bracket 35 are welded together prior to installation of the guard.

The strip extends upwardly from the port 37 and is bent to follow along the underside of the attaching flange 34 and the cowl 7 toward the bulkhead. To obviate the need for offsetting the strip at the edge of the flange 34 a shim 33 is interposed between the open side of the strip and the underside of the cowl. Adjacent to the junction of the cowl and bulkhead, the strip 28 is bent downwardly to lie against one face of the bulkhead to have its open side closed thereby, and to lead to the ignition coil which is generally mounted on the bulkhead. The coil determines which face of the bulkhead the strip 28 overlies.

While it is customary practice to mount the coil on the engine compartment side of the bulkhead, it could very well be located at the opposite side thereof, or even on some other wall or support, this being a matter of choice with the automobile manufacturer; but in any event the sheath formed conjointly by the strip 28 and the wall or walls to which it is secured extends to and opens into the casing or base of the coil to protect the conductor 14 and the terminal 9 of the coil.

In the present instance the strip has a stamped sheet metal cup 29 welded or otherwise fixed thereto. This cup provides a cover for the terminal 9 of the coil and thus may be considered part of the coil casing. It also, in effect, acts as a continuation of the conductor protecting sheath.

In the present instance the coil 8 is mounted on the bulkhead, at its engine compartment side, over a hole 30 therein as by means of a collar 31 secured to the bulkhead and overlying a flange 32 on the coil casing. The securement of the flange 32 to the bulkhead should be by means incapable of removal by such ordinary tools as screw drivers and wrenches. Any fastening which requires the use of a special tool not ordinarily found in mechanics' tool kits, as for instance ratchet headed screws 31', would suffice. During assembly the conductor 14 is connected to the terminal 9 of the coil and then the coil is mounted in position. In this manner the terminal 9 and the end of the conductor attached thereto are disposed within and covered by a cup 29 which in this case is mounted on the passenger compartment side of the bulkhead over the hole 30.

Attention is directed to the fact that the important coil terminal 12 is the lower-most one of the several switch terminals. Hence, the side walls 39 of the guard cooperate with the other terminals 13 of the switch to obstruct access to the coil terminal 12 from the open top of the guard. Access to the coil terminal 12 of the switch and the conductor 14 connecting it with the coil, at least to the extent of permitting defeat of the locked ignition switch, is thus a virtual impossibility. Only by unlocking the ignition switch from the instrument panel, shifting it bodily rearward to disengage it from the mounting bushing 23 and then bringing it out of the open top of the guard into a position overhanging the side of the guard with its terminals facing downwardly as indicated in broken lines in Figures 1 and 2, is it possible to have manipulative access to the switch terminals and especially the coil terminal 12.

It is, of course, to be understood that the portion of the conductor 14 within the guard 26 is long enough, and the space between the back wall 36 of the guard and the nearest switch terminal is great enough to allow bodily rearward removal of the switch from its mounting bushing 23 and placement thereof in the indicated position at which its terminals are accessible.

From the foregoing description taken in connection with the accompanying drawing it will be readily apparent that this invention provides a simple, inexpensive manner of protecting the coil terminal of an ignition switch and the conductor leading therefrom against the tampering involved in an effort to defeat the locked ignition switch.

What I claim as my invention is:

1. In an automobile provided with an instrument panel having an ignition switch thereon with its terminal head and terminals behind the panel, and provided with a bulkhead dividing the passenger compartment from the engine compartment, and having an ignition coil secured to the bulkhead at its engine compartment side with the terminal of the coil which is to be connected with the switch, facing the passenger compartment and in line with a hole in the bulkhead, and a conductor electrically connecting said coil terminal with one of the terminals of the switch: means for protecting the electrical connection between the switch and coil against unauthorized access, said means comprising, a guard embracing the bottom, sides and terminal head of the switch, and a sheath enclosing the conductor and extending from the guard to a point adjacent to the hole in the bulkhead, said sheath having a part covering the said coil terminal and closing the hole in the bulkhead.

2. In an automobile having a bulkhead dividing the passenger compartment from the engine compartment, and having an instrument panel in the passenger compartment, the combination of: a key controlled ignition switch locked to the instrument panel with its terminals behind the panel; an ignition coil having a terminal adapted for electrical connection with a terminal of the ignition switch; means mounting the ignition coil on the engine compartment side of the bulkhead over a hole therein with its said terminal facing the passenger compartment and in line with the hole, the coil and its mounting means covering the hole and rendering the said coil terminal inaccessible from the engine compartment; a guard fixed behind the instrument panel with a portion thereof below and in juxtaposition to the ignition switch, said guard rendering access to the switch terminals extremely difficult as long as the switch is locked to the instrument panel; a conductor secured to and electrically connecting the said switch and ignition coil terminals; and a sheath leading from the guard to a point adjacent to the hole in the bulkhead, said sheath enclosing and protecting the conductor and having a part covering the said coil terminal and closing the hole at the passenger compartment side of the bulkhead.

3. The combination set forth in claim 2 further characterized by the fact that the sheath is fixed to a rigid part of the automobile and provides the sole support for the guard.

4. The combination set forth in claim 2 further characterized by the fact that the mounting of the switch on the instrument panel entails substantial axial movement of the switch to enable attachment and detachment of the switch and that the guard has bottom, side and end walls to embrace the bottom, sides and terminal head of the switch with sufficient space between the terminals of the switch and the end wall of the guard to allow axial movement of the switch toward and from the back of the instrument panel as required for attachment and detachment of the switch, and that the conductor is long enough to allow its securement to and removal from the said switch terminal upon detachment of the switch from the instrument panel and its placement in such a position relative to the guard as to render the switch terminals accessible for manipulation.

5. The combination set forth in claim 2 further characterized by the fact that the bulkhead forms one wall of the sheath for part of its length and that the part of the sheath which covers the coil terminal and closes the hole on the passenger compartment side of the bulkhead is a cup-shaped stamping having its edge fixed to the bulkhead.

6. In an internal combustion engine driven vehicle having an instrument panel, the combination of: an ignition switch having a terminal head with a plurality of terminals including a coil terminal projecting substantially perpendicularly from the head and adapted to be electrically connected with the ignition coil of the vehicle; means mounting the ignition switch on the panel with the terminal head behind the panel and with the coil terminal lowermost; a conductor secured to the coil terminal of the switch for connecting the same with the ignition coil of the vehicle; and means for protecting the conductor and its connection to the coil terminal of the switch against tampering, said means comprising a sheet metal sheath for the conductor and a guard joined to the sheath and fixed with respect to the switch, said guard being substantially trough-like and having the terminal head and terminals received therein with the bottom of the trough directly under the coil terminal and the sides of the trough extending up directly along the sides of the other switch terminals, so that said other switch terminals cooperate with the guard to obstruct access to the coil terminal of the switch.

7. In an internal combustion engine driven vehicle having an instrument panel the combination of: an ignition switch having a terminal head with a plurality of terminals including a coil terminal projecting substantially perpendicularly from the terminal head and adapted to be electrically connected with the ignition coil of the vehicle; means mounting and locking the ignition switch on the instrument panel with the terminal head behind the panel and with the coil terminal lowermost, detachment of the switch entailing a bodily movement thereof rearwardly away from the panel; a conductor secured to the coil terminal of the switch for connecting the same with the ignition coil of the vehicle; a channel-shaped guard; means mounting the guard in a fixed position with the terminal end of the switch nested therein and the bottom of the guard directly under the coil terminal and the sides of the guard extending up alongside the other switch terminals, so that said other switch terminals cooperate with the sides of the guard to obstruct access to the coil terminal of the switch from the open top of the guard; an end wall closing the end of the channel-shaped guard remote from the instrument panel to further obstruct access to the coil terminal of the switch, said end wall being spaced far enough from the switch terminals to permit rearward bodily movement of the switch as required for detachment thereof from the instrument panel and placement thereof in a position removed from the guard and at which access may be had to its coil terminal; and a sheath for the conductor joined to the guard.

8. In an automobile having an instrument panel and a wall behind the panel the combination of: an ignition switch on the instrument panel with its terminal head and terminals behind the panel; an ignition coil on said wall and having a terminal adapted to be electrically connected with one of the switch terminals; a conductor secured to and electrically connecting the said coil terminal and one of the switch terminals; a guard structure separate from the switch and having a switch protecting part provided with walls adapted to cover the bottom, sides and terminal head end of the switch; means mounting said guard structure in said protective relationship to the switch whereby the crowded condition of the limited space behind the panel enables said guard structure to effectively preclude access to the switch terminals; and means forming part of the guard structure for protecting the portion of the conductor extending from the guard to the coil.

9. The combination set forth in claim 8 further characterized by the fact that the conductor protecting part of the guard structure includes a stamped sheet metal strip a portion of which overlies said wall to define a conductor sheath leading to the coil.

10. In an automobile having an instrument panel, a cowl, and a wall behind the panel the combination of: an ignition switch on the instrument panel with its terminal head and terminals behind the panel; an ignition coil on said wall and having a terminal adapted to be electrically connected with one of the switch terminals; a conductor secured to and electrically connecting the said coil terminal and one of the switch terminals; a guard separate from the switch and adapted to embrace the same with the walls of the guard covering the bottom, sides and terminal head end of the switch; a supporting bracket for the guard secured to the underside of the cowl and extending downwardly therefrom behind the switch, said guard being secured to and carried by the bracket, said bracket forming substantially the continuation of the end wall of the guard; and means for protecting that portion of the conductor outside the guard comprising a stamped sheet metal strip having a conductor receiving depression therein and spaced to overlie said mounting bracket cowl and said wall to which the coil is secured, with said mounting bracket cowl and wall closing the open side of the strip to define a protective sheath for the conductor extending from the guard to the coil.

11. The combination set forth in claim 10 further characterized by the provision of means defining a cover for the terminal on the coil and connected with the adjacent end of the sheath so as to preclude access to the coil terminal and the end of the conductor secured thereto.

12. In an automobile having an instrument panel and a bulkhead behind the panel, the combination of: an ignition switch on the instrument panel with its terminal head and terminals behind the panel; a casing on the bulkhead housing an ignition coil having a terminal adapted to be electrically connected with one of the switch terminals; a conductor secured to and electrically connecting said coil terminal and one of the switch terminals; and a sheet metal guard structure cooperating with the bulkhead and the casing of the coil to enclose the conductor leading from the switch to the coil and having a portion shaped to cover the sides, bottom and terminal head of the switch to render access to the switch difficult.

EDWARD N. JACOBI.

REFERENCES CITED

The following references are of record in the file of this patent:

UNITED STATES PATENTS

| Number | Name | Date |
| --- | --- | --- |
| 1,375,549 | Barnes | Apr. 19, 1921 |
| 2,242,142 | Parker | May 13, 1941 |